Patented July 30, 1935

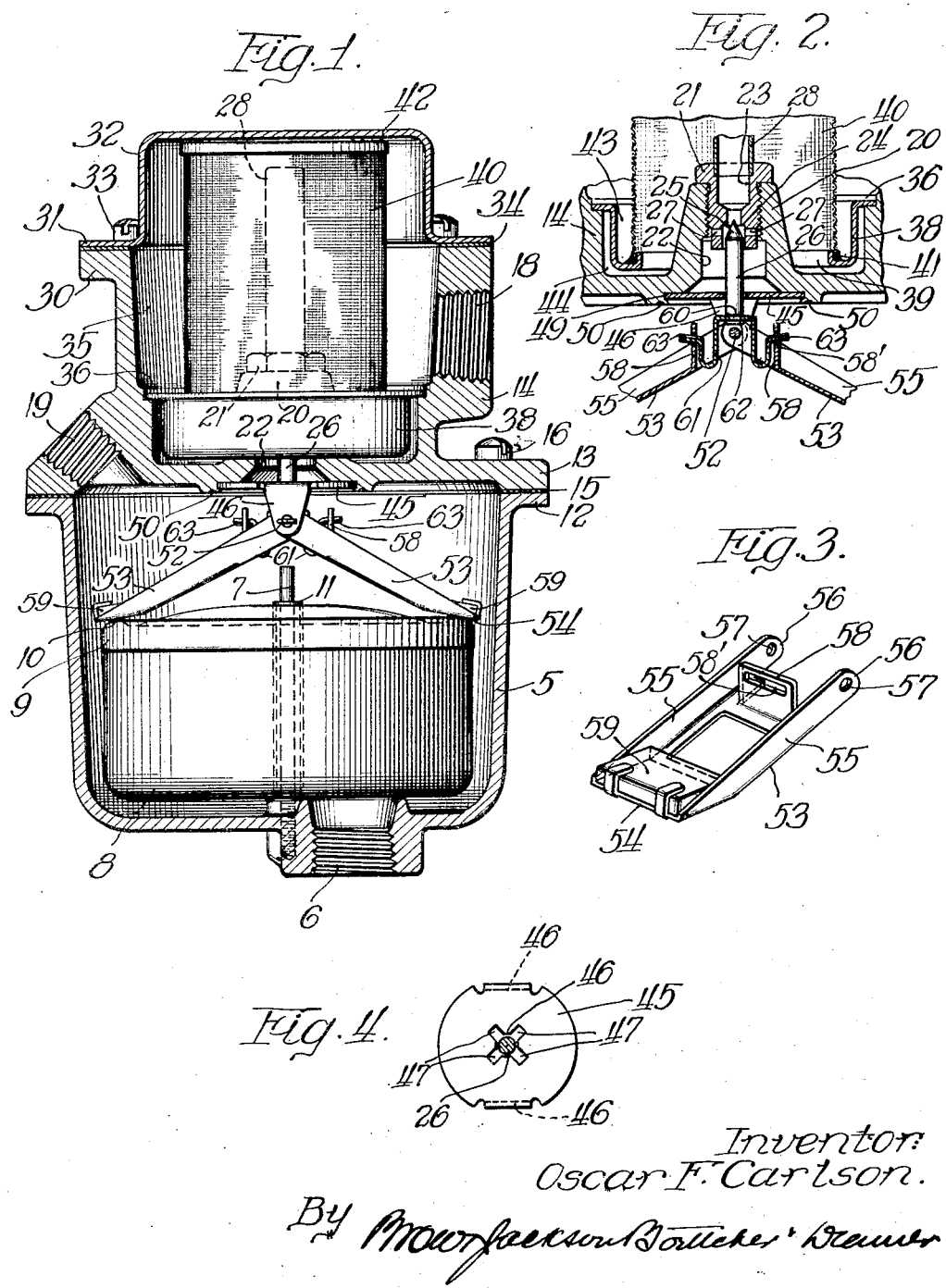

2,009,649

UNITED STATES PATENT OFFICE 2,009,649

LEVEL CONTROL VALVE

Oscar F. Carlson, Chicago, Ill., assignor to Oscar F. Carlson Company, Chicago, Ill., a corporation of Illinois Application March 8, 1934, Serial No. 714,609

7 Claims. (Cl. 137—68)

This invention relates to level control valves, and more particularly to level control valves for controlling the flow of liquid fuel to a burner or the like, although it is not to be limited to this particular use.

In the design of valves of this type, one of the primary objects is to provide a compact and easily assembled construction having relatively few working parts and having substantially frictionless operation. Because of the need for relatively delicate adjustment of the level control valve in order to meter the flow of fuel to the burner properly, it is also necessary that some means be provided for preventing the passage of coarse particles, such as grit or the like, which may be in the liquid, into the float chamber of the valve, since such particles may cause clogging of the valve passage or of the burner ports, besides causing extensive carbonization at the burner.

The preferred embodiment of the present invention is directed to the provision of a level control valve having filtering means associated therewith, disposed within a relatively small, compact and easily assembled construction. The present construction comprises three coaxial superimposed housings, the lower housing serving as a float chamber, the intermediate housing serving as a cover for the float chamber and containing the liquid flow control valve and filter means, and the upper housing serving as a fuel inlet chamber and as a cover for the intermediate chamber.

One of the main features of the present invention is the disposition of the operating parts of the valve structure in substantially coaxial alignment, whereby they occupy a minimum of space and may thus be enclosed within a relatively small housing structure.

Another feature of the present invention is the provision of filtering or straining means disposed between the inlet port and the valve controlling the flow of liquid to the float chamber.

A novel advantage produced by the structure of the present invention is the independent mounting of the float which controls operation of the valve, whereby cocking or angular displacement of the float means will not affect the operation of the valve or valve stem.

One of the main objects of the present invention is the provision of increased leverage between the movement of the float means and the valve stem, whereby the valve can withstand high inlet pressures without leakage, and also, movement of the float means will result in direct and positive corresponding movement of the valve means.

Another object of the present invention is to provide an economical valve operating means, comprising metal stampings forming the leverage connection between the float and the valve stem. In addition, I provide a novel bearing member formed from a stamping whereby any particles of grit or the like cannot be wedged between the stem and the bearing.

A further object of the present invention is the elimination of the air pocket in the fluid inlet chamber, and the utilization of the entire surface area of the filtering means. Also, any settlings or particles of grit which may pass through the filtering means will not be introduced into the valve passageway, by reason of a standpipe within the filtering means which takes liquid in only at the upper end of the filtering means.

A still further object of the present invention is the provision of weighted leverage means between the float and the valve stem, whereby any tendency of the valve stem to stick or gum is overcome, and the valve is positively opened when the float drops in the float chamber.

Other objects and advantages of the present invention will appear more fully from the following detailed description, which, taken in connection with the accompanying drawing, will disclose to those skilled in the art the particular construction and operation of a preferred form of my invention.

In the drawing:

Figure 1 is a sectional elevational view of the level control valve of the present invention;

Figure 2 is a fragmentary detail view showing the valve and valve operating means;

Figure 3 is a perspective view of one of the lever arms transmitting movement of the float to the valve member; and Figure 4 is a plan view of the novel bearing provided for the valve stem of the present invention.

Referring now in detail to the drawing, I have disclosed a lower housing, indicated by the reference numeral 5, which is provided on its lower surface with a fuel outlet indicated at 6, having a threaded port opening adapted to receive a fluid conduit or the like. The lower surface of the housing is tapped to receive a stud member 7, which extends vertically therefrom and which serves as a bearing support for a float 8.

The float 8 is hollow, and is provided with a flanged cover portion 9, having an annularly curved raised portion 10 forming a bearing surface. Extending centrally of the float 8 is a tube 11, soldered or otherwise secured thereto, which forms a guide for permitting axial movement of the float with respect to the stud or stem 7.

The upper portion of the float chamber or housing 5 is flanged, as indicated at 12, to receive a correspondingly flanged portion 13 of the intermediate housing indicated generally at 14. A suitable gasket 15 is interposed between the flanges 12 and 13, and the intermediate housing is secured to the lower housing 5 by means of a plurality of cap screws 16 spaced about the periphery of the housings.

The housing 14 is provided with a liquid inlet port indicated at 18, this port preferably being threaded to receive the threaded end of a fuel supply conduit. The intermediate housing 14 may also be provided with a second angularly extending threaded port 19, providing an outlet for the float chamber, which may be connected to any desired conduit.

The housing 14 is provided with a centrally disposed raised boss portion shown at 20 in Figure 2, which is internally threaded to receive a valve plug member 21. The boss portion 20 of the housing 14 is recessed, as shown at 22, and opens into the chamber formed by the housing 5. It will thus be seen that the housing 14 provides a cover for the chamber formed by the housing 5 and, further, provides the inlet means from the housing 14 to the housing 5. The valve plug 21 is recessed, as shown at 23 in Figure 2, and is provided with a valve seat portion 24 adapted to form a seat for the tapered valve 25 having the extending stem portion 26.

The valve plug 21 is also provided with laterally extending ports 27 which provide for liquid flow from the recess 23 past the valve seat 24 and into the recess 22 communicating with the housing 5. At its upper end the plug 21 is recessed to form a seat for a standpipe or tubular stem member 28 extending upwardly therefrom, the member 28 being press-fitted or otherwise suitably secured in the plug member.

The upper portion of the housing 14 is flanged, as shown at 30, and receives the flanged portion 31 of a cover member 32, which is secured by cap screws 33 about the flanged portion thereof, there being a suitable gasket member 34 interposed between the flanges 30 and 31. This cover member 32 provides a cover for the inlet chamber indicated generally at 35, which communicates with the inlet port 18.

Within the inlet chamber 35, an annular shoulder indicated at 36 is formed in the housing 14, and serves as a support for a radially flanged cup-shaped member 38, which has its flanged portion seating in the annular shoulder 36, as shown in Figure 2. The central portion of the cup-shaped member 38 is upturned, as indicated at 39, and a suitable screen or other type of straining member 40 is soldered thereto, as indicated at 41. The screen 40 has its upper end enclosed by a suitable cover member 42 secured thereto, and the screen member thus forms filtering means for the liquid passing from the inlet 18 into the inlet chamber 35, through the screen 40, and thence down the standpipe member 28 into the recess 23 communicating with the valve passageway. The tubular member 28 thus allows for use of the entire effective area of the filter 40, and eliminates the air pocket at the upper end of chamber 35. Further, any particles of dirt or the like entering the filtering means will not pass into the member 28, since its open end is disposed at the upper end of the filter.

Grit, dirt particles and the like will become lodged in the annularly grooved recess indicated at 43, provided between the cup-shaped member 38 and the screen 40, and thus will not become wedged in the meshes of the screen. Because of this provision, the screen 40 does not require as frequent cleaning as is necessary in cases where the dirt particles are not retained in any suitable receiving means.

When it is desired to clean the filtering means, the cover 32 is removed, and the screen 40 together with the cup-shaped member 38, may then be lifted off of the shoulder 36 and may be properly cleaned and returned to position. A relatively tight fit is maintained between the shoulder 36 and the flange portion of the member 38, thus preventing particles of dirt or the like from passing the shoulder into the space 44 beneath the member 38.

Considering now in detail the valve actuating means, the valve stem 26 extends downwardly through a bearing plate 45 of novel construction. The bearing plate 45, as best shown in Figure 4, comprises a metal stamping of substantially circular form having extending tongue portions indicated at 46, which are bent at right angles to the plane of the plate 45, and serve as pivotal supports for the valve actuating means. The disc 45 is also provided with a plurality of slots 47, which extend laterally from the opening 48 through which the valve stem 26 passes, and which serve to provide for passage of fuel into the chamber 5 and, at the same time, prevent any grit or the like from lodging between the plate 45 and the stem 26, since the slots will prevent any wedging of dirt particles or grit in the opening 48. This stamping 45 is adapted to seat in a recessed shoulder 49 formed in the lower surface of the housing 14, and is held in position by means of a plurality of prick punches indicated at 50 which are made about the periphery of the shoulder 49. This eliminates the necessity of machining the recess 49 or the stamping 45.

The downwardly extending tongues 46 of the stamping 45 are provided with openings adapted to receive a pin member 52, which serves as a pivot for a pair of oppositely extending actuating arms indicated generally at 53. One of these arms is shown in perspective in Figure 3.

Each of the arms 53 is formed from a metal stamping, and has a substantially flattened outer end portion 54 adapted to bear against the surface 10 of the cover 9 of the float 8. This flattened portion rides upon the bearing surface 10, and has substantially line contact therewith. The stamping is formed with parallel side web portions 55 which strengthen the same and serve as additional means for preventing bending of the member 53 intermediate its ends. The web portions 55 terminate at their inner ends in extending tabs 56, which are provided with openings 57 adapted to receive the pivot pin 52. Adjacent the openings 57 and disposed between the parallel web portions 55, is an upturned edge indicated at 58, formed integral with the member 53, and extending above the upper surface of the parallel web portions 55. It will be noted that the tongue 58 is disposed angularly with respect to the longitudinal axis of the member 55, so that it extends substantially vertically when the arms are in the position shown in Figures 1 and 2. It will also be noted that the flattened end portions 54 of each of the arms are disposed angularly in the same manner.

Each end portion 54 is preferably provided with a weight 59, which weight is either soldered to the arm 53, or secured thereto by integrally formed finger members, as desired. These weights serve to overcome any tendency of the valve member 26 to stick, and positively open the valve upon lowering of the float 8.

The lower end of the valve stem 26 is provided with an annular groove indicated at 60 which is adapted to receive an actuating collar indicated generally at 61, the end of the stem 26 being spun over, as shown at 62, for securing the collar in position. The collar 61 comprises a metal stamping pressed into substantially the form shown in Figure 2, and having the laterally extending offset portions 63, which are adapted to be engaged in the slots 58' of the upturned tongues 58 of the arms 53. These offset portions 63 are substantially concave in shape, thus providing what might be termed a knife edge support for the collar 61 upon the lower edges of the slots 58' of the tongues 58. In the operation of the device, fluid entering the inlet port 18 passes through the strainer 40 into the interior thereof, and past the recess 23 to the valve seat 24. When there is no liquid in the housing 5, liquid passes from the valve seat 24 through the ports 27 into the recess 22, and thence through the openings 47 in the stamping 45, into the housing 5. As the housing begins to fill with liquid, the float 8 rises, and the arms 53, bearing on the surface 10, are raised.

The raising of the arms 53, because of the engagement of the tongues 58 with the offset arms 63 of the collar 61, results in corresponding raising of the valve stem 26, which tends to close the valve 25 against the valve seat 24. This shuts off the flow of liquid through the valve plug 21, and, until the liquid in the housing 5 is withdrawn through outlet 6, no further flow of liquid is effected past the valve member 25. The line contact between arms 53 and the float, the substantially point contact of the tongues 58 with the collar 61, and the relatively small bearing surface between stem 26 and plate 45, all cooperate to produce a substantially frictionless valve mechanism.

In most instances, the liquid entering the inlet port 18 is under considerable pressure, and consequently a considerable pressure is placed upon the surface of the valve 25, tending to open the same. However, because of the proximity of the upturned tongues 58 with respect to the pivots 52, and the substantially elongated arms 53 bearing upon the outer periphery of the float 8, a substantial leverage effect is produced because of the nearness of the tongues 58 to the fulcrum point 52 of these lever arms 53, and consequently the float is able to hold the arms in position against relatively high pressures exerted upon the valve 25. It is also apparent that, because of the direct abutting engagement of the arms with both the float and the valve actuating collar, any slight degree of movement of the float will result in a corresponding change in position of the valve member 25, upward movement of the float tending to close the valve, whereas downward movement of the float releases the arms tending to hold the valve against the inlet pressure of the liquid, and consequently the arms draw the valve downwardly and the port 27 is uncovered.

It is apparent, in considering the present invention, that by the use of stampings for the arms 53, the disc 45 and the collar 61, considerable economy can be effected in the manufacture of these parts, and also their surfaces, due to the metal from which they are stamped, will always be polished, and consequently do not require this further operation after formation of the members. This reduces the frictional engagement of the arms and of the corresponding portions of the members. Also, by the provision of the slots 47, which not only provide for flow of liquid through the disc 45 but also prevent the lodging of grit in the opening 48 including the valve stem 26, it is impossible, in the present construction, to lodge the valve stem in such a position that it will not be moved downwardly when the float 8 lowers.

It is to be pointed out that the stud 7 upon which the float 8 is mounted, need not be positioned coaxial with the valve stem 26, but may be placed in any convenient location near the center of the chamber 5. Also, it will be noted that angular cocking of the float 8 about the stud 7 will not result in a corresponding cocking of the valve member.

Because of the provision of the three superposed housings, each of the upper housings serving as a cover for the next adjacent lower housing, and the provision of the annular seat formed in the intermediate housing for retaining the filtering means in position, the valve structure can be assembled readily and may be disassembled readily for repair, cleaning or replacement of any of the parts thereof.

It is to be understood that the invention is not to be limited to the specific details of construction which have been shown in the preferred illustration of my invention, but only insofar as defined by the scope and spirit of the appended claims.

I claim:

1. In combination, a float, a valve, actuating means secured to said valve, and means for transmitting movement of said float to said actuating means comprising a plurality of extending arms having a common central pivot, the outer ends of said arms bearing against float actuated means, each of said arms comprising a stamping having a flattened end portion, parallelly extending side web portions having pivot supports at the inner ends thereof, and an upturned tongue portion disposed between said web portions and adjacent said pivot support, said tongue portion engaging said actuating means.

2. In combination, a float chamber, a bearing stud secured to the base thereof, a float movable axially of said stud, a pair of oppositely extending arms having a common pivot at their inner ends and engaging the upper surface of said float at their outer ends, upturned engagement means formed integrally with said arms, a valve having a valve stem, and means carried by said stem and engaging in said engagement means for moving said valve in accordance with movement of said float.

3. The combination with level control valve means and float means for actuating said valve means, of means for transmitting movement of said float means to said valve means including a lever arm having a flattened end portion bearing on the periphery of said float means, said arm having opposite parallelly extending stiffening web means extending lengthwise thereof, and a bearing tongue struck out of said arm between said web means and having a transverse slot engageable with said valve means.

4. In combination, in a device of the class described, a float chamber, a float therein, a valve at the upper end of said chamber having a valve stem terminating above said float, a pair of downwardly and laterally offset tongue members at the end of said stem, a pair of arms pivoted together at one end thereof and having their free ends engaging said float, upwardly extending tongues formed on said arms intermediate their ends and having slots receiving said offset tongue members of said valve stem, and means guiding said float for vertical movement and disposed coaxially with said stem below the pivoted ends of said arms.

5. In a float valve, a main frame member 14 having a central opening 22, a valve seat member 21 fixed in said opening and providing a valve seat 24, an auxiliary frame plate 45 secured to the bottom of the main frame member independently of the seat member, said plate having integral ears 46, a pivot pin 52 supported in said ears transversely of the axis of said opening, a pair of divergent float actuated arms 53 supported on said pivot pin, a valve stem 26 having a valve 25 cooperating with the valve seat, said plate having an opening through which said stem extends, and a yoke 60 attached to the end of the stem and having arms extending into interlocking operative engagement with the float actuated arms.

6. The combination of claim 5, wherein the main frame member 14 has a counterbore 49 at the lower end of the opening 22, the plate member 45 comprises a sheet metal stamping with arcuate edges fitting the counterbore, and the margins of the counterbore having the metal thereof battered over said arcuate edges of the plate.

7. The combination of claim 5 wherein the arms 53 have substantially vertically extending ears 56 which are transversely slotted and the yoke 60 is a resilient sheet metal member provided with tongues 63 extending substantially horizontally through said ears, said yoke and said arms having interengaging shoulders to limit the angular approach of the arms toward each other.

OSCAR F. CARLSON.